United States Patent
Shimojo et al.

(10) Patent No.: US 6,643,256 B1
(45) Date of Patent: Nov. 4, 2003

(54) PACKET SWITCH AND PACKET SWITCHING METHOD USING PRIORITY CONTROL BASED ON CONGESTION STATUS WITHIN PACKET SWITCH

(75) Inventors: Yoshimitsu Shimojo, Kanagawa (JP); Hideaki Nakakita, Kanagawa (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/461,362

(22) Filed: Dec. 15, 1999

(30) Foreign Application Priority Data

Dec. 15, 1998 (JP) .......................... P10-356012

(51) Int. Cl.[7] .............................................. H04L 12/56
(52) U.S. Cl. ...................... 370/229; 370/235; 370/389
(58) Field of Search ............................. 370/388, 395.1, 370/389, 235, 412, 414, 416, 418, 427, 237

(56) References Cited

U.S. PATENT DOCUMENTS 5,301,333 A * 4/1994 Lee
5,790,522 A * 8/1998 Fichou et al. ................ 370/236
5,841,773 A * 11/1998 Jones ........................ 370/395
6,144,636 A * 11/2000 Aimoto et al. .............. 370/229

OTHER PUBLICATIONS

J. Hui, "Switching and Traffic Theory for Integrated Broadband Networks", ISBNO-7923-9061-X, Kluner. Academic Publishers; 1990.
Peter Newman, "A Fast Packet Switch for the Integrated Services Backbone Network", IEEE Journal on Selected Areas in Communications vol. 6, No. 9, (1988), pp 1468-1479.
S. Kalyanaraman et al., "A One-bit Feedback Enhance Diffentiated Services Architecture", IETF Internet-draft, draft-shivkuma-ecn-diffserv-oo.txt;, (1998), pp 5-12.

* cited by examiner

Primary Examiner—Kenneth Vanderpuye
(74) Attorney, Agent, or Firm—Foley & Lardner

(57) ABSTRACT

A packet switch and a packet switching method capable of taking the full advantage of the transfer capability of the packet switch by avoiding the influence due to the congestion are disclosed. In the packet switch, the priority level according to the congestion status of the transfer target is attached to a packet, and the processing at a time of packet collision is carried out by accounting for this priority level, so that it becomes possible to carry out the packet transfer control according to the congestion status of the transfer target of each packet.

18 Claims, 7 Drawing Sheets

PACKET SWITCH AND PACKET SWITCHING METHOD USING PRIORITY CONTROL BASED ON CONGESTION STATUS WITHIN PACKET SWITCH

BACKGROUND OF THE INVENTION

1. Field of the Invention

The present invention relates to a packet switch and a packet switching method for switching packets between a plurality of ports.

2. Description of the Background Art

In recent years, there are considerable progresses in the field of data communications. Traditionally, the most representative communication network has been a telephone network, but the importance of a data communication network such as Internet is increasing rapidly due to the spread of PCs for business use and home use. Recently a technique for realizing telephone service on the data communication network has also been developed by taking advantages of low cost and high efficiency of the data communication network, and there is even a discussion of amalgamation of the telephone network into the data communication network.

Now, the data communication networks are mostly packet switching networks (which are to be construed as including ATM switching networks) that carry out communications of data to be transmitted to which information indicating a destination is attached, that is, packets (which are to be construed as including cells in ATM. As the traffic amount of the data communications increases, there is an increasing demand for a larger scale packet switch for switching these packets.

There are many propositions for a configuration of a packet switch, which can be largely classified into two types. One is a multiple stage switch type in which the number of ports can be made large, which is a rather old type, and the other is a single stage switch type in which the number of ports is small, which is a relatively new type.

The single stage switch type packet switches are often equipped with a congestion control mechanism in order to prevent a congested output port from affecting flows of packets destined to the other non-congested output ports. In contrast, the multiple stage switch type packet switches presuppose that the traffic characteristics (rate) are determined in advance, so that a severe congestion has not been taken into consideration in most of them. It appears that this is also largely due to the fact that it has been difficult to implement a mechanism for dealing with the congestion in the multiple stage switch type which presupposes the extension to the large number of ports, because the congestion occurs as a result of interplay between a plurality of input ports and a plurality of output ports.

In the Internet which is the most representative data communication network, a rate by which each user transfers packets is not determined in advance, so that the congestion can possibly occur anywhere at any time. For this reason, in designing an architecture of a packet switch, techniques for dealing with the congestion are equally important as techniques for realizing the large scale implementation. The techniques for dealing with the congestion include a technique for notifying a user so as to have the packet transfer rate lowered by the user when the congestion occurs within the packet switch, and a technique for preventing the occurred congestion from affecting flows of packets that are unrelated to that congestion.

In the following, such a conventional multiple stage switch type packet switch will be described briefly.

In the case of the multiple stage switch type packet switch, a large scale packet switch can be obtained by combining smaller switching elements in multiple stages (see Joseph Y. Hui: "Switching and Traffic Theory for Integrated Broadband Networks", ISBN 0-7923-9061-X, Kluwer Academic Publishers, 1990, sections 5.5 and 6.3).

FIG. 1 shows an exemplary configuration of a multiple stage switch type packet switch of 27 inputs and 27 outputs obtained by combining switching elements 145 each having 3 inputs and 3 outputs.

A packet entered from an input port 121 is transferred from an input side transfer unit 102 via a switching unit 104 to a desired output side transfer unit 106, and outputted from there to an output port 161. This multiple stage switch type packet switch can be extended to a lager packet switch by increasing the number of switching elements and the number of stages. Also, when each switching element is replaced by a larger switching element of 8 inputs and 8 outputs, for instance, a large scale packet switch can be formed using lesser number of switching elements.

A well known configuration of the multiple stage switch type packet switch is that in which a random network and a routing network are connected in cascade connection. A random network 141 and a routing network 143 of FIG. 1 are coupling networks that are line symmetric with respect to each other. In each network, any input link can reach to arbitrary output link, through a unique route. By connecting the random network and the routing network in cascade connection, there are as many routes from a given input side transfer unit 102 to a given output side transfer unit 106 as the number of switching elements on a border between the random network and the routing network (nine in FIG. 1).

A packet outputted from the input side transfer unit 102 is transferred to a randomly selected link so as not to collide with other packets within the random network 141 and reaches to an input of the routing network 143. This random transfer is done for the purpose of distributing packets probabilistically to inputs (nine in FIG. 1) of the routing network 143. The packet is then transferred according to its destination within the routing network 143 and reaches to the output side transfer unit 106.

Inside the routing network 143, there is a possibility for a packet collision to occur as a result of having a plurality of packets simultaneously transferred towards one and the same output link of some switching element. If they are packets destined to the same output side transfer unit 106, they are bound to collide, and even if they are packets destined to different output side transfer units 106 they may still collide. In a packet switch in which each switching element does not have a queuing buffer, when the collision occurs, only one of these packets is transferred while the other one is immediately discarded. When a packet is discarded as a result of such a collision, the corresponding input side transfer unit 102 re-transmits the discarded packet.

In this way, even when a packet is discarded inside the switching unit 104, the input side transfer unit 102 keeps re-transmitting that packet until it is successfully transferred to the output side transfer unit 106. Consequently, the packet information will never be lost inside the switching unit 104. When viewed from outside of the packet switch, the packet is discarded only inside the input side transfer unit 102 and the output side transfer unit 106.

In the packet transfer control in such a multiple stage switch type packet switch, three types of congestion may occur, each of which will now be described. Here, for the sake of clarity of the explanation, it is assumed that the switching unit 104 has 4 inputs and 4 outputs obtained by combining switching elements of 2 inputs and 2 outputs each in 3 stages as shown in FIGS. 2 to 4.

Even in this small scale switching unit, the configuration is basically the same as FIG. 1 in that it has the random network 141 from the first stage switching element 145 up to the input of the second stage switching element, and the routing network 143 from the output of the second stage switching element up to the third switching element 145, so that the following description of the three types of congestion is applicable to the switching unit of FIG. 1 or even larger scale.

First, with reference to FIG. 2, the first type of congestion will be described.

In an example shown in FIG. 2, it is assumed that a packet destined to the output transfer unit [C] exists at the input side transfer unit [A], and a packet destined to the output side transfer unit [D] exists at the input side transfer unit [C]. In this case, an ideal packet switch should be able to transfer these two packets simultaneously as they have different destinations. However, in practice, there can be situations in which the random network 141 transfers these two packets (accidentally) to the lower side switching element 145 at the second stage of the switching unit 104, for example. When such a situation occurs, these two packets cannot reach to their respective destinations simultaneously, On the contrary, if these two packets are transferred separately to the upper side switching element and the lower side switching element at the second stage, this congestion could have been avoided. Such a congestion will be referred to as "inside routing network collision".

There are several propositions for resolving the transfer performance degradation due to this inside routing network collision. For example, the known methods include a method for connecting a random network in cascade connection as a front stage of the routing network so as to distribute packets such that the inside routing network collision will not be concentrated to a particular set of packets, and a method for increasing the packet transfer rate of the switching unit higher than that of the input port and the output port such that the apparent throughput from outside the packet switch will not be lowered even when packet re-transmissions take place due to this congestion. By devising the switch architecture in this way so that the congestion will not occur continually, it is possible to conceal the influence of this congestion from outside the switch.

Next, with reference to FIG. 3, the second type of congestion will be described.

In an example shown in FIG. 3, it is assumed that packets destined to the same output side transfer unit [C] exist at two input side transfer units [A] and [C]. These two packets are bound to collide before they reach to the output side transfer unit [C] regardless of the routes by which they are transferred inside the random network 145. Such a congestion will be referred to as "output side transfer unit input congestion".

This congestion occurs basically when packets having the same destination are concentrated continually. For example, in FIG. 3, if there is a flow of packets destined to the output side transfer unit [D] from the input side transfer unit [B] in addition, the flow of the packets destined to the output side transfer unit [D] would be degraded due to an influence of the continual transfer of excessive packets destined to the output side transfer unit [C].

In the packet switch such as the conventional multiple stage switch type one, there are many output side transfer units so that a method for appropriately dealing with this congestion has been an unresolved problem. This is because, when there are many output side transfer units, it has been difficult to collect information as to which output side transfer unit is crowded and which output side transfer unit is not, all at once.

Next, with reference to FIG. 4, the third type of congestion will be described.

This congestion occurs when the rate of the output port of the output side transfer unit ([C] in an example of FIG. 4) is slower than the arrival rate of packets destined to that port. This congestion will be referred to as "inside output side transfer unit congestion". In an example shown in FIG. 4, when the output side transfer unit [C] is congested, it is actually meaningless for the input side transfer unit [A] to transfer packets destined to the output side transfer unit [C] unnecessarily frequently, and it suffices to transfer at about the rate of the output port of the output side transfer unit [C].

However, the conventional packet switch could have transferred excessively many packets to the same output port, and this in turn induces the first type congestion (inside routing network collision) and the second type congestion (output side transfer unit input congestion) described above. This completes the description of the three types of congestion.

As described, the conventional multiple stage switch type packet switch has an advantage in that it can be formed in a large scale by combining switching elements, but there has been no satisfactory method for dealing with the severe congestion. In other words, there has been a possibility for having a large number of packets destined to the congested port transferred within the switching unit. These are wasteful transfers for which the possibility of being discarded within the switching unit is high. The transfers in excess of the transfer rate of the output port is actually meaningless, and it could cause a situation in which a large number of packets that are transferred in excess are discarded within the switching unit and re-transmitted repeatedly. In such a situation, even packets destined to non-congested ports may collide with packets destined to the congested port within the switching unit such that the discarding and the retransmission are repeated and the flow is degraded. This is a drawback that can eventually lower the packet transfer efficiency of the entire packet switch considerably.

Thus there has been a demand for the congestion control in the multiple stage switch type packet switch in which the number of ports can be made large, for the purpose of application to the Internet or the like in which the traffic is increasing rapidly.

SUMMARY OF THE INVENTION

It is therefore an object of the present Invention to provide a packet switch and a packet switching method capable of taking the full advantage of the transfer capability of the packet switch by avoiding the influence due to the congestion.

It is another object of the present Invention to provide a packet switch and a packet switching method in which the flow of packets destined to non-congested ports will not be affected by the influence of packets destined to the congested port.

It is another object of the present invention to provide a packet switch and a packet switching method in which once discarded packets can be made less likely to be discarded at a time of re-transmission.

It is another object of the present invention to provide a packet switch and a packet switching method in which a plurality of packets subdividing a single data can be transferred collectively.

According to one aspect of the present invention there is provided a packet switch, comprising: a plurality of input side transfer units from which packets are entered; a plurality of output side transfer units from which packets are outputted; a switching unit through which each packet entered from each input side transfer unit is switched to a desired output side transfer unit; a congestion status monitoring unit configured to monitor a congestion status of each transfer target within the packet switch; a priority level attaching unit configured to attach a priority level to each packet, according to the congestion status of a transfer target of each packet monitored by the congestion status monitoring unit; and a packet selection unit configured to select one packet that is to be transferred at a higher priority among colliding packets when a packet collision occurs within the switching unit, according to the priority level attached to each colliding packet.

According to another aspect of the present invention there is provided a packet switch, comprising: a plurality of input side transfer units from which packets are entered; a plurality of output side transfer units from which packets are outputted; a switching unit through which each packet entered from each input side transfer unit is switched to a desired output side transfer unit, the switching unit having a configuration in which no packet collision occurs; a congestion status monitoring unit configured to monitor a congestion status of each prescribed transfer target; and a connection pattern calculation engine configured to attach a priority level to each packet, according to the congestion status of a transfer target of each packet monitored by the congestion status monitoring unit, carry out a simulation in which each packet is assumed to be transferred through a virtual switching network having a topology in which a packet collision may occur and a packet to be transferred at higher priority among colliding packets is selected according to the priority level attached to each colliding packet when the packet collision occurs in the virtual switching network, and determine a connection pattern of the switching unit such that a result of switching packets at the switching unit coincides with a result of transferring packets from the input side transfer units to the output side transfer units according to the simulation.

According to another aspect of the present invention there is provided a packet switching method of a packet switch in which a packet is transferred from an input side transfer unit via a switching unit to a desired output side transfer unit, the method comprising: transferring the packet by attaching a priority level according to a congestion status of a transfer target of the packet, from the input side transfer unit to the switching unit; switching the packet transferred from the input side transfer unit according to the transfer target of the packet at the switching unit, and transferring one colliding packet selected from colliding packets by accounting for the priority level attached to each colliding packet, at higher priority to the output side transfer unit when a packet collision occurs within the switching unit; and notifying information indicating a monitoring result of the congestion status for a prescribed unit of monitoring, from the output side transfer unit to which the packet has reached, to the input side transfer unit which transmitted the packet.

According to another aspect of the present invention there is provided a computer usable medium having computer readable program codes embodied therein for causing one or a plurality of computers to function as a packet switch in which a packet is transferred from an input side transfer unit via a switching unit to a desired output side transfer unit, the switching unit having a function of selecting one packet that is to be transferred at a higher priority among colliding packets when a packet collision occurs within the switching unit, according to the priority level attached to each colliding packet, the computer readable program codes include: a first computer readable program code for causing said one or a plurality of computers to monitor a congestion status of each transfer target within the packet switch; and a second computer readable program code for causing said one or a plurality of computers to attach a priority level to each packet, according to the congestion status of a transfer target of each packet monitored by the first computer readable program code.

Other features and advantages of the present invention will become apparent from the following description taken in conjunction with the accompanying drawings.

DETAILED DESCRIPTION OF THE PREFERRED EMBODIMENTS

Figure 5:
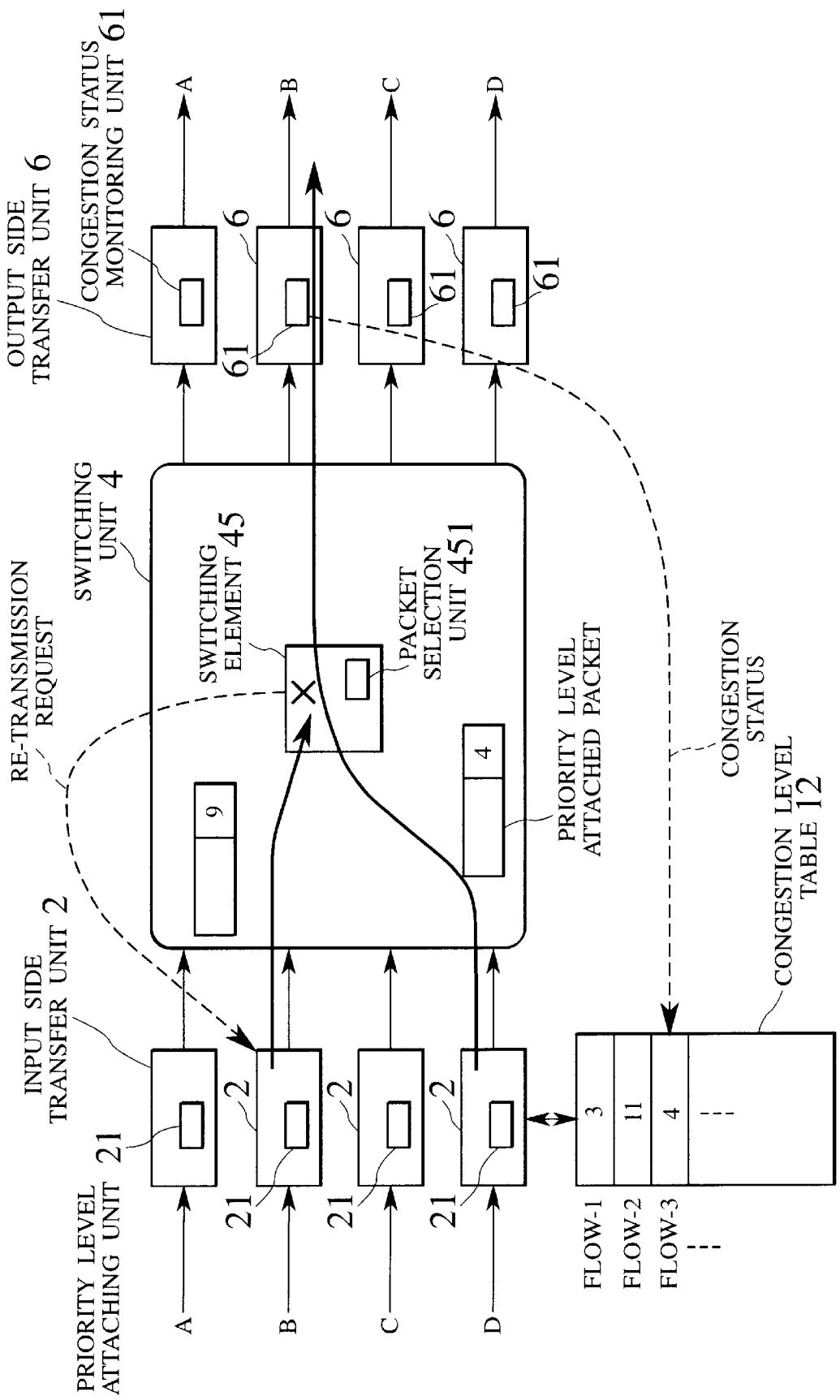
FIG. 5 is a schematic block diagram showing one exemplary configuration of a packet switch according to the first embodiment of the present invention.
Figure 6:
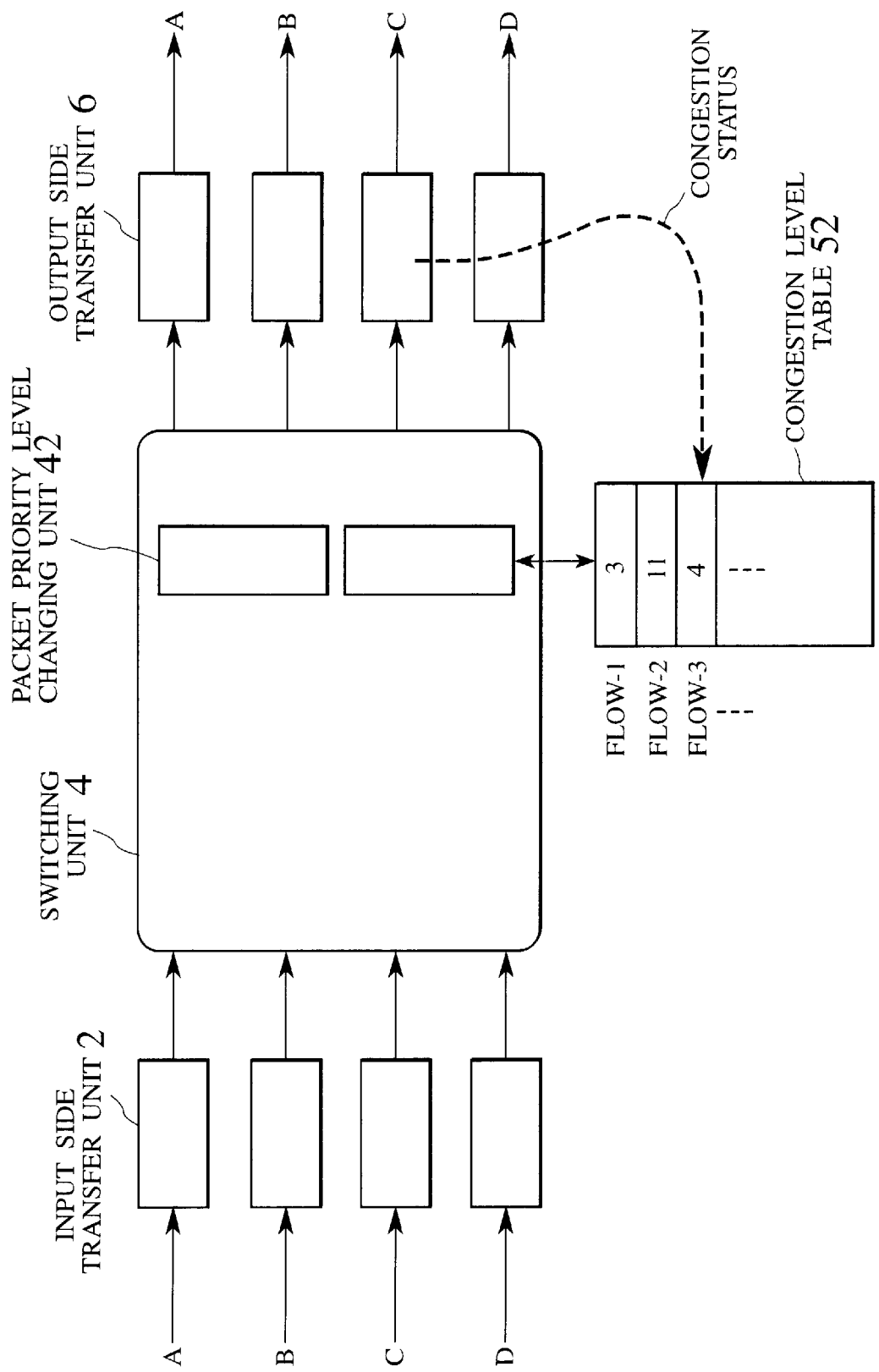
FIG. 6 is a schematic block diagram showing another exemplary configuration of a packet switch according to the first embodiment of the present invention.

Referring now to FIG. 5 and FIG. 6, the first embodiment of a packet switch and a packet switching method according to the present invention will be described in detail.

FIG. 5 shows an exemplary configuration of a multiple stage switch type packet switch in the first embodiment, along with the outline of the operation of this packet switch.

Figure 1:
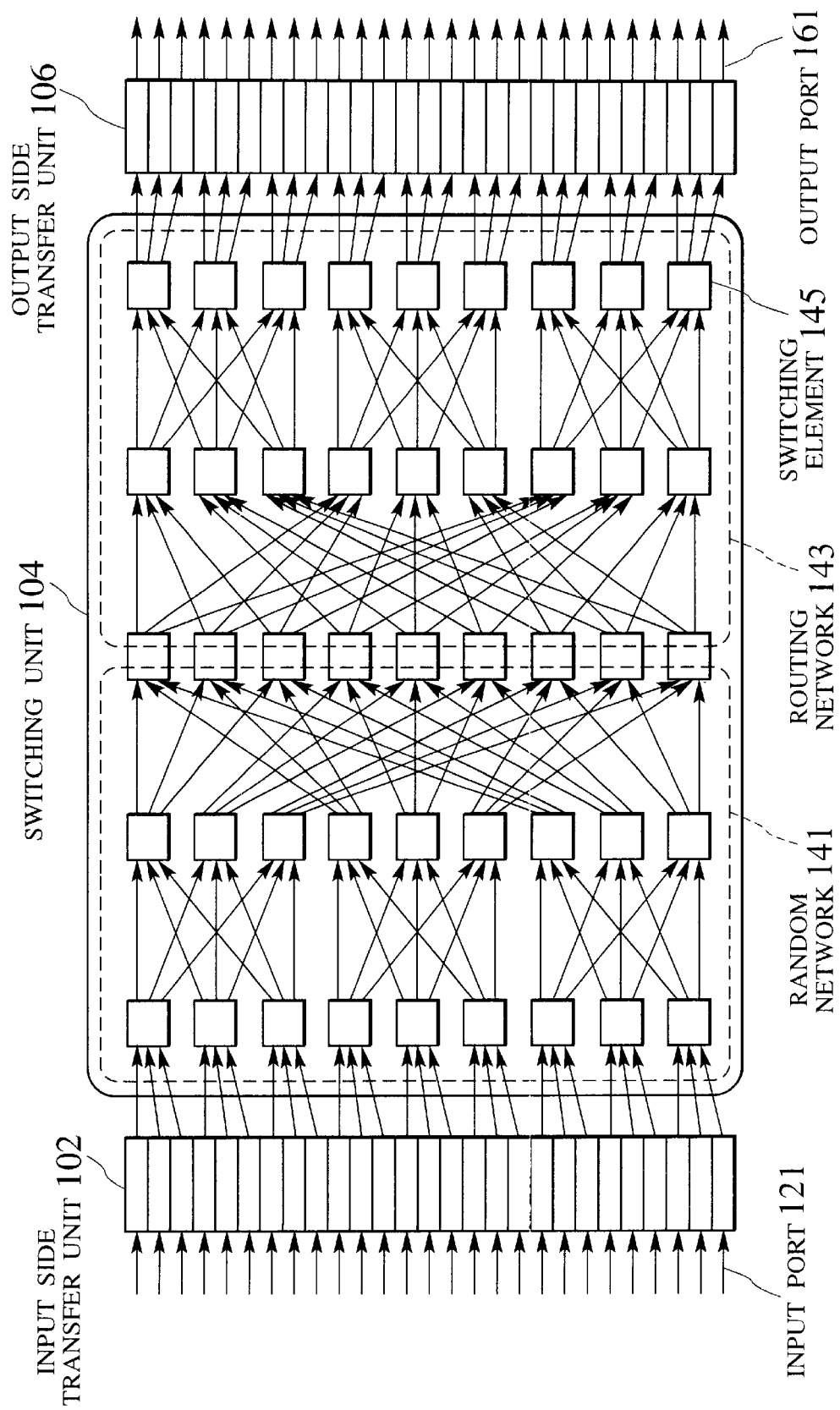
FIG. 1 is a block diagram showing an exemplary configuration of a conventional multiple stage switch type packet switch.
Figure 2:
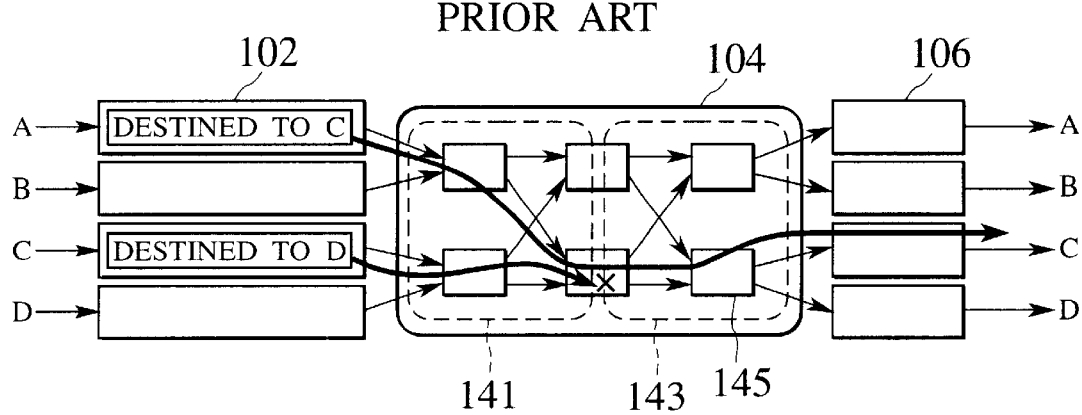
FIG. 2 is a diagram for explaining one example of an inside routing network collision that can occur in a conventional packet switch.
Figure 3:
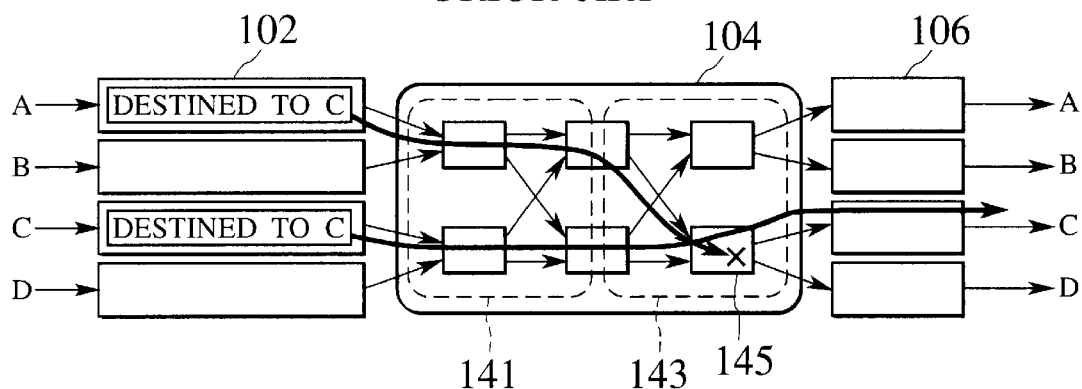
FIG. 3 is a diagram for explaining one example of an output side transfer unit input congestion that can occur in a conventional packet switch.
Figure 4:
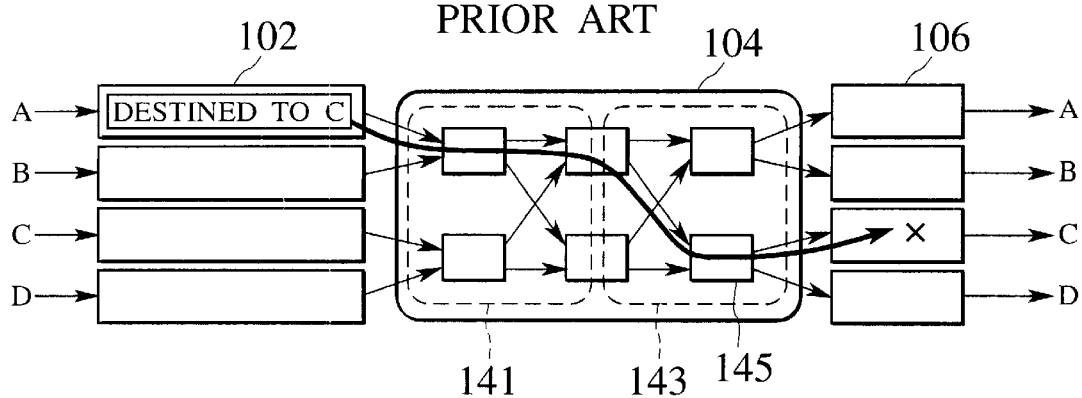
FIG. 4 is a diagram for explaining one example of an inside output side transfer unit congestion that can occur in a conventional packet switch.

The basic overall configuration of this packet switch is similar to that of FIG. 1 in that a packet entered from an input port is transferred from an input side transfer unit 2 via a switching unit 4 to a desired output side transfer unit 6, and outputted from there to an output port. The number of input ports and the number of output ports in this packet switch are arbitrary. Also, a plurality of input ports or output ports may be set in correspondence to one input side transfer unit or output side transfer unit. The internal network configuration inside the switching unit 4 of this packet switch is also arbitrary, and the number of inputs and the number of outputs of each switching element that constitutes that network are also arbitrary. Of course, this packet switch may have the same overall configuration as that of FIG. 1. Note that FIG. 5 shows an exemplary case of having four input side transfer units 2 and four output side transfer units 6. Also, FIG. 5 omits a detail of the internal configuration of the switching unit 4.

Here, a "packet" in this embodiment may be data to be switched by this packet switch itself, or information to be transferred inside the switching unit prior to the data transfer (the former will be referred to as data packet while the latter will be referred to as "request").

When a word "packet" indicates "request", the input side transfer unit 2 transmits a request with a destination information written therein to the switching unit 4 prior to the data transfer. In this request, a priority level is also written. When the request successfully reaches to the destination output side transfer unit 6 or when it is judged to have reached there, the data packet corresponding to this request is transferred from the input side transfer unit 2 to the output side transfer unit 6. The request reserves a route such that, when the data packet is transferred along this route, the data packet can be transferred to the output side transfer unit 6 safely without colliding with another data packet in a middle. By transferring a request corresponding to a next data packet while transferring a current data packet, it is possible to switch data from the input side transfer unit 2 to the output side transfer unit 6 efficiently in a pipeline-like manner.

In this embodiment, data to be exchanged itself and a request to be transferred prior to the data packet transfer will be generically referred to by a word "packet" without distinguishing them, because the present invention is effectively applicable to either case.

Also, the present invention is equally applicable to a packet switch that uses a request (or reserves a route) and a packet switch that does not use a request (or does not reserve a route).

The above remarks also apply to the subsequent embodiments to be described below as well.

Now, in the packet switch of this embodiment, at a time of transferring the packet from the input side transfer unit 2 via the switching unit 4 to the desired output side transfer unit 6, a priority level is attached to each packet, and a priority control among packets to be transferred is carried out according to this priority level at the switching unit 4. Note that this priority level is used only locally within the packet switch.

The priority level is set by accounting for at least the congestion status with respect to a transfer target of a packet that is to be reached within the packet switch, such as an output side transfer unit, an output port, a class or a flow to which the packet belongs that is defined by subdividing the output port further, for example. Here, the flow is defined by a destination address of the packet or its appropriate combination with packet (header) information such as a port number, a protocol number, etc., for example, which is given by a virtual connection in the case of ATM communications. At a time of setting the priority level, it is also possible to account for other information such as a prescribed attribute associated with the packet (a service class to which the packet belongs, for example), or a special condition associated with the packet (such as an indication that it is a re-transmission packet, for example), for example.

There is no particular limitation regarding the steps of the priority level, because the present invention is effectively applicable regardless of the number of steps of the priority level.

The present invention is also effectively applicable regardless of a location at which the priority level is attached to the packet, but this embodiment is directed to an exemplary case where the priority level is attached to the packet at each input side transfer unit 2.

The present invention is also effectively applicable regardless of whether the congestion status is monitored inside the switching unit 4 or inside the output side transfer unit 6, but the latter is more suitable so that this embodiment is directed to an exemplary case where the congestion status is monitored at each output side transfer unit 6 and this information is notified to the input side transfer unit 2.

In order to realize the control based on the priority level set by accounting for the congestion status, the packet switch of FIG. 5 has an exemplary configuration in which each input side transfer unit 2 has a priority level attaching unit 21 and a congestion level table 12, each output side transfer unit 4 has a congestion status monitoring unit 61, and each switching element 45 has a packet selection unit 451.

Note that it is also possible to adopt a configuration in which a single congestion level table is shared by all the input side transfer units 2. In such a case, a congestion level table management unit (not shown) for receiving a notification of an information regarding the congestion status from the output side transfer units 6 and reflecting this information into the common congestion level table 12 can be provided. It is also possible to adopt a configuration in which the packet selection unit 451 is not provided in some switching elements 45.

In short, the priority level attaching unit 21 of the input side transfer unit 2 has a congestion level table management function that receives a notification of an information regarding the congestion status as monitored by the congestion status monitoring unit 61 of the output side transfer unit 6 and reflects this information into the congestion level table 12, and a priority level attaching function that determines the priority level to be attached to the packet by accounting for the content of the congestion level table 12 when the packet is to be transmitted from this input side transfer unit 2.

The congestion level may be an information regarding the notified congestion status itself, or a value obtained by converting the information regarding the notified congestion status. The congestion level may be set in units of the output side transfer units, in units of output ports, or in units of classes or flows that are defined by subdividing the output port further.

As a basic manner of setting the priority level, it is possible to set the lower priority level for packets with the congestion level is higher and the higher priority level for packets with the lower congestion level, by referring to the congestion level corresponding to each packet from the congestion level table 12.

Note however that it is possible to consider various variations regarding a relationship between the congestion level and the priority level. For instance, the congestion level and the priority level may have a linear relationship or a nonlinear relationship. Also, the number of steps of the congestion level and the number of the steps of the priority level may be set to be identical or different. Also, as already mentioned above, the priority level may be obtained from the congestion level and the other information.

Also, a procedure or a function for obtaining the priority level from the congestion level may be defined in the same units in which the congestion level is set, or in units that are finer than those of the congestion level. For instance, the priority level may be set in units of flows while the congestion level is set in units of output ports.

In short, the packet selection unit 451 of the switching element 45 selects a packet to be transferred at a higher priority by accounting for the priority levels attached to packets when they collide.

As a basic manner of packet selection, it is possible to select a packet having the highest priority level. However, it is also possible to select a packet by also accounting for the other information (such as some kind of information that is described in the packet header) in addition to the priority level.

It is also possible to provide some special selection criteria for the case in which a single packet cannot be selected by the ordinary judgement, as in the case where a plurality of packets having the highest priority level exist. Alternatively, in the case where a single packet cannot be selected by the ordinary judgement, one of a plurality of packets having the highest priority level may be selected randomly.

In short, the congestion status monitoring unit 61 of the output side transfer unit 4 monitors the congestion status of the corresponding output side transfer unit 4. The information regarding the monitored congestion status is notified from the corresponding output side transfer unit 4 to the input side transfer unit 2.

The monitoring of the congestion status may be carried out in units of the output side transfer units, in units of output ports, or in units of classes or flows that are defined by subdividing the output port further.

As the information regarding the congestion status that is to be notified, it is possible to directly use a prescribed measurement value regarding the congestion status (such as the number of packets or bytes that are transferred per unit time, the queue length (the number of packets or bytes) of a packet queue, or the number of packets or bytes that are discarded from a packet queue, for example). It is also possible to use a result of classification of the prescribed measurement values into congested and non-congested according to a single reference value, or level values obtained by classifying the prescribed measurement values according to plural reference values.

A Note that the units of the congestion status monitoring and the units of the congestion level table entry may be made identical (both can be in units of output ports, for example), or the units of the congestion level table entry may be made coarser than the units of the congestion status monitoring (the former can be in units of output ports while the latter is in units of flows, for example).

In the following, this embodiment will be described in further detail.

First, the case in which a packet collision occurred will be described.

When a packet collision (such as the inside routing network collision) occurred inside the switching unit 4, the switching element 45 at the corresponding location selects a packet to be transferred at a higher priority by accounting for the priority levels attached to the collided packets, using the packet selection unit 451, and transfers only the selected packet.

The other packet that is not selected will be immediately discarded and then re-transmitted by the corresponding input side transfer unit 2 later on, for example (in this case, there is a need for the input side transfer unit 2 to maintain the transmitted packet for a certain period of time in view of the possibility of the packet re-transmission). As a method for specifying a timing for the re-transmission, it is possible-to use a method in which the switching element that discarded the packet sends a re-transmission message to the input side transfer unit 2, or a method in which the output side transfer unit 4 to which the packet has reached is to send a packet arrival message to the transfer source input side transfer unit 2, and the input side transfer unit 2 judges that the packet is discarded when the packet arrival message from the transfer target output side transfer unit 4 is not received even after a certain period of time has elapsed.

Alternatively, it is also possible to use a configuration in which all or a part of the switching elements are equipped with a packet buffer, and the packet that is not selected is temporarily stored in a queue of the packet buffer inside that switching element instead of being immediately discarded.

Next, the monitoring and the notification of the congestion status will be described.

This embodiment incorporates a feature that the congestion status of the route on which the packet is transferred is monitored, and the information regarding that congestion status is notified to a portion that attaches the priority level to the packet (the input side transfer unit 2 in this embodiment). As mentioned above, in this embodiment, a location for monitoring the congestion status is set to be the output side transfer unit 6, which is more suitable for this purpose. This point will now be described.

If the rate at which packets are outputted from the output side transfer unit 6 to the output port is lower than the rate at which the packets inflow from the switching unit 4 into the output side transfer unit 2, the congestion status inside the switching unit 4 will be reflected in the congestion (the increase of the number of packets or bytes that are stored in the output buffer, for example) inside the output side transfer unit 6. In other words, whenever the output side transfer unit input congestion occurs, the inside of the output side transfer unit 6 is also congested.

Also, even if the congestion does not occur inside the switching unit 4, there are cases where the congestion (the inside output side transfer unit congestion described above) occurs only inside the output side transfer unit 6. This congestion occurs more frequently in the configuration in which a single output side transfer unit 6 has a plurality of output ports.

From the above, it can be seen that both the output side transfer unit input congestion and the inside output side transfer unit congestion can be detected by monitoring only the output side transfer unit 6.

Note that the congestion status is monitored in units of output side transfer units, output ports, classes, flows (virtual connections, for example), or their combination. FIG. 5 shows an exemplary case of monitoring the congestion status for each flow and setting an entry of the congestion level table 12 for each flow.

Now, the congestion status so monitored is to be notified to the input side transfer unit 2 in this embodiment, and there are several possible methods for notifying the congestion status to the input side transfer unit 2.

For example, it is possible to use a method in which the congestion status is sent along with an ACK/NACK signal to be transferred from the output side transfer unit 6 to the input side transfer unit 2. An ACK (Acknowledgement) signal for notifying that a packet has safely arrived at the output side transfer unit 6 and a NACK (Negative Acknowledgement) signal for rejecting a packet for some reason even when a packet arrived at the output side transfer unit 6 are signals to be transferred from the output side transfer unit 6 to the input side transfer unit 2 even in the conventional packet switch. According to the generally well known method, these signals are returned from the output side transfer unit 6 to the input side transfer unit 2 that transmitted that packet, along the transfer route of the packet in the reverse direction. One method for notifying the congestion status is to send the information regarding the congestion status along with this ACK/NACK signal.

As another method, it is possible for each output side transfer unit 6 to generate and return a packet for notifying the information regarding the congestion status whenever a prescribed number (which may be set to 1) of packets arrive at the unit of monitoring (port, for example), or whenever a prescribed period of time has elapsed, toward the input side transfer unit 2 that has transmitted a packet at that moment or the input side transfer unit 2 that has transmitted a packet between that moment and a time of the previous notification.

By transferring the congestion status in such a manner, it becomes possible to notify the congestion status of the output side transfer unit 6 to the input side transfer unit 2 easily even in the packet switch with the large number of ports.

Note that, in any of the cases described above, when the unit of monitoring is set to be a unit (port, for example) that is finer than the output side transfer unit, the information regarding the congestion status to be notified may be an information for all the transfer targets which share the same output side transfer unit 6 instead of an information for the same transfer target (port, for example) as the arrived packet, or an entire information for all the output side transfer units 6.

Also, the information regarding all the congestion statuses for all the output side transfer units 6 may be notified to all the input side transfer units 2.

Also, as mentioned above, instead of monitoring and notifying the congestion status at the output side transfer unit 6, the congestion status may be monitored at and notified from the switching element 45 that is located at one or plural stages previous to the output side transfer unit 6, or both the output side transfer unit 6 and the switching element 45.

Next, the several examples of the packet transfer control based on the priority level within the packet switch will be described.

First, the most representative control, that is, the priority control to be carried out according to the congestion status will be described.

In general, the priority level of a packet is usually determined according to a class to which that packet or a flow of that packet belongs such as the real time information or the best effort information, for example, but in this embodiment, this priority level is set according to the congestion status (or the priority level that is originally assigned as described above is changed).

For example, the priority level of the packet destined to the congested transfer target (which is assumed to be the congested port here) is lowered. A packet with a higher priority level will be handled at a higher priority even when the collision occurs inside the switching unit 4, so that packets with lower priority levels destined to the congested port are virtually non-existent for the packet with a higher priority level.

Consequently, in this embodiment, there is an effect that the flow of packets destined to the non-congested port is hardly disturbed by the flow of packets destined to the congested port. Even for the packet destined to the congested port, only its priority level is changed and the transfer rate is not suppressed, so that it is possible to continue to attempt the transfer to the output side transfer unit 2 by utilizing an idle time between the transfers of the packets with the higher priority levels. For this reason, it is possible to continue to transfer packets at the full transfer capacity of the switching unit 4, even with respect to the congested port.

As an alternative to this embodiment, it is possible to consider a complicated control in which the transfer rate of packets destined to the congested port is to be strictly suppressed according to the congestion level instead of using the priority level, but according to this embodiment, such a transfer rate suppression control is unnecessary so that there is an advantage in that a structure of the input side transfer unit 2 can be made simpler.

Note that the method for transferring a packet by attaching the priority level is already conventionally known, but this embodiment essentially differs from such a conventional method in that the priority level is set or changed dynamically according to the congestion level.

Next, the priority control with respect to the re-transmission packets will be described.

In the packet switch using a scheme in which the input side transfer unit 2 re-transmits a packet that was discarded as a result of the collision inside the switching unit 4, if the same packet is discarded consecutively, there arises a possibility for affecting the entire flow of packets that are waiting for transfers after that packet.

As a method for resolving this problem, it is possible to raise the priority level of the re-transmission packet higher than the priority level of the original packet when the packet is discarded inside the switching unit 4. With this control, there is an advantage that the re-transmission packet becomes less likely to be discarded again. If the re-transmission packet is discarded again, it is possible to raise the priority level of the retransmission packet for that discarded re-transmission packet even higher. In this way, the unfortunate packet that has been re-transmitted repeatedly can be transferred at a higher priority.

Next, the priority control with respect to a probe packet will be described.

As in the case of the re-transmission packet described above, there are other situations where the temporal change of the priority level is beneficial.

For example, in the configuration in which the information regarding the congestion status is to be notified from the output side transfer unit 6 to the input side transfer unit 2 that has transmitted the packet at a timing of the arrival of the packet to the output side transfer unit 6, when the input side transfer unit 2 transfers a packet to a new destination for the first time (or after a sufficiently long period of time during which the congestion status has likely been changed), the congestion status of its destination cannot be ascertained (or the actual congestion status of its destination cannot be ascertained). A packet to be transferred when the congestion status of the destination is unknown (or virtually unknown) as such is mainly significant as a probe signal to ascertain the congestion status of the destination. Such a packet will be referred to as a probe packet here.

By raising the priority level of this packet for probing (probe packet) higher, the probe packet becomes less likely to be discarded at the switching unit 4 so that the congestion status of the destination can be ascertained promptly, and there is an advantage that the priority levels of packets to be transferred subsequently can be set to appropriate values quickly. Although it is sufficient to set a high priority level only to the first one packet, it is also possible to set a high priority level to the first plural packets depending on the convenience of the implementation or the like.

Next, the priority control with respect to the divided datagram will be described.

As another example in which it is beneficial to change the priority level temporarily, when a datagram that is divided into plural portions is to be transferred to the switching unit 4, it is possible to set the priority level of a packet corresponding to the first portion of the datagram lower than the priority level of packets corresponding to the remaining portions of the datagram. Equivalently, it is also possible to set the priority levels of packets corresponding to the remaining portions of the datagram higher than the priority level of a packet corresponding to the first portion of the datagram. For instance, the priority level of the top packet can be set according to the method of this embodiment, and the priority levels of the second and subsequent packets can be set much higher.

Also, in the first transfer of the top packet, if the top packet failed to reach the output side transfer unit 6, the transfer can be repeated by setting the priority level higher.

In this way, once the top packet corresponding to the first portion of the datagram reaches to the output side transfer unit 6, the subsequent portions will also reach the output side transfer unit 6 consecutively at a higher priority, so that it becomes possible to transfer the datagram comprising plural packets to the output side transfer unit 6 collectively. In the case where the output side transfer unit 6 reconstructs the original datagram from the divided plural portions and then output the reconstructed datagram to the external, there is an advantage that the amount of buffer required in order to reconstruct the datagram can be made smaller by carrying out the transfer as described above at the switching unit 4.

As described, apart from the method for determining the priority level of the packet according to the congestion level alone, there is also a method for determining the priority level of the packet by applying the change according to the congestion status, the change according to the number of re-transmissions, etc., to the priority level of the class to which the packet or the flow belongs, for example, or a method for determining the priority level of the packet by using the congestion level, the class, and/or other factors as parameters.

It is also possible to guarantee the packet transfer rate within the switching unit 4 by carrying out the control to raise the priority level of the packet higher. For example, it is possible to provide a service that guarantees the minimum value of the transfer rate by monitoring the flow transfer rate at the input side transfer unit 2 and carrying out the control which temporarily raises the priority level when the monitored transfer rate approaches to a prescribed minimum transfer rate. In this service, it is possible to carry out transfers at a rate above the guaranteed rate when the switch is not crowded. In addition, it is also possible to attach weights to packets and divide the bandwidth by a ratio of weights.

Note that, when the priority level attaching unit 21 for setting or changing the priority level of the packet is realized by providing a processor inside the input side transfer unit 2 and determining the priority level by software, it becomes possible to flexibly handle the change in the number of classes to be dealt with or the port configuration of the packet switch during its operation.

Next, some variations of the congestion level table 12 and the priority level attaching unit 21 will be described.

In this embodiment, one of the major features is that the priority level of the packet destined to the corresponding destination is changed according to the congestion status notified from the output side transfer unit 6.

As an exemplary realization of this feature, there is a method in which the congestion level obtained from the information regarding the congestion status notified in response to the packet transfer is stored in the congestion level table 12 of the input side transfer unit 2 that transferred that packet, and the priority level of the packet destined to the same destination that is to be transferred from there is set or changed according to the congestion level table 12. Besides this method, there are also many variations of the method for realizing this feature.

For example, it is possible to store the information regarding the congestion status at plural locations, such as at plural input side transfer units 2 commonly. Using the congestion level table 12 commonly, each input side transfer unit 2 can use the congestion status obtained by the other input side transfer unit 2 in addition to the congestion status obtained by this input side transfer unit 2 itself, so that more congestion statuses can be ascertained and there is an advantage that a probability for being capable of dealing with the congestion immediately becomes high.

Also, as another method, as shown in FIG. 6, it is possible to (attach the priority level not accounting for the congestion status to the packet at the input side transfer unit 2 and) change the priority level attached to the packet to that accounting for the congestion status at a packet priority level changing unit 42 provided inside the switching unit 4, instead of attaching the priority level accounting for the congestion status to the packet at the input side transfer unit 2.

In this case, the congestion status transferred from the output side transfer unit 6 is notified to the packet priority level changing unit 42 inside the switching unit 4. The packet priority level changing unit 42 obtains the congestion level from the notified congestion status and stores the obtained congestion level into a congestion level table 52, and changes the priority level of the packet according to the destination of the packet that passes through there. It is not absolutely necessary for a single packet priority level changing unit 52 to handle all the output side transfer units 6 of the packet switch. By providing a plurality of packet priority level changing units 52 in a single switching unit 4 such that each packet priority level changing unit 52 handles only the nearby output side transfer units 6, the processing can be distributed and the implementation can be made easier.

In this case, the priority level according to the congestion status of the destination can be attached to the packet at a location closer to that destination, so that there is an advantage that the priority level can be attached to the packet effectively.

Figure 7:
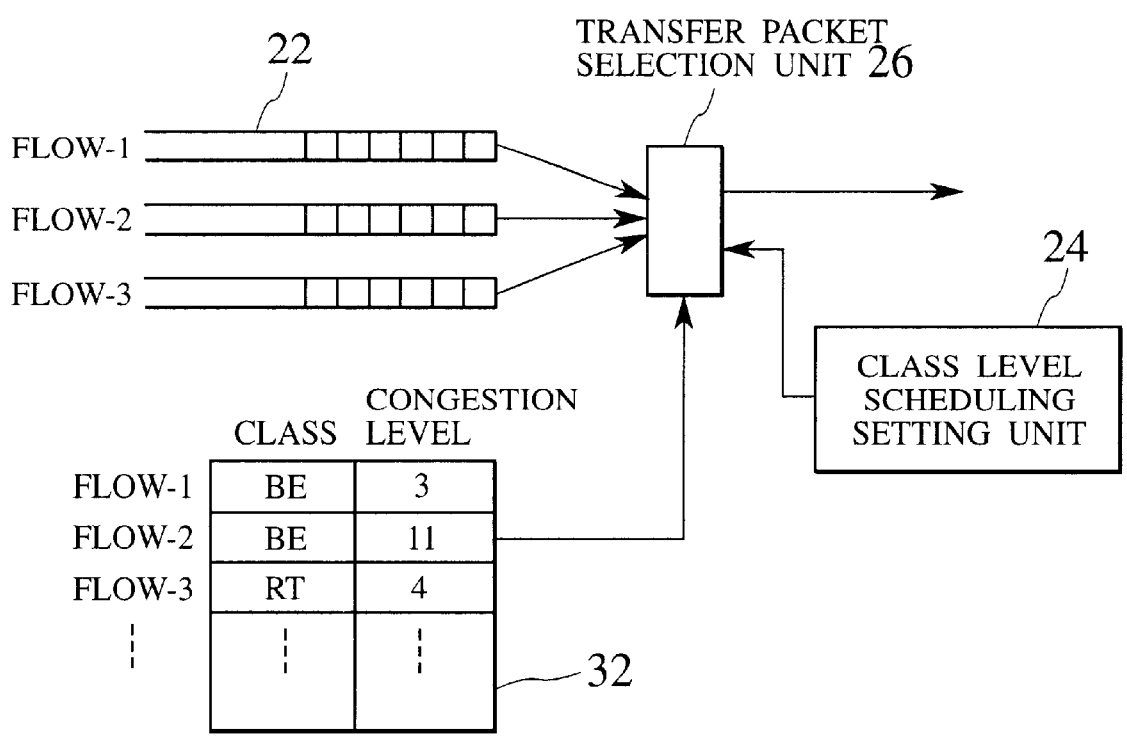
FIG. 7 is a schematic block diagram showing an exemplary configuration of a scheduling unit in a packet switch according to the second embodiment of the present invention.

Referring now to FIG. 7, the second embodiment of a packet switch and a packet switching method according to the present invention will be described in detail.

In the first embodiment, the priority level is controlled according to the congestion level, whereas in this second embodiment, the scheduling (a processing for selecting a packet to be transferred when a plurality of packets are waiting for transfers to the switching unit) is carried out by accounting for the congestion level.

The basic overall configuration of the multiple stage switch type packet switch of this second embodiment is similar to that of FIG. 1 as in the first embodiment, in that a packet entered from an input port is transferred from an input side transfer unit 2 via a switching unit 4 to a desired output side transfer unit 6, and outputted from there to an output port. Also, similarly as in the first embodiment, the number of input ports and the number of output ports in this packet switch are arbitrary, a plurality of input ports or output ports may be set in correspondence to one input side transfer unit or output side transfer unit, the internal network configuration inside the switching unit 4 of this packet switch is also arbitrary, and the number of inputs and the number of outputs of each switching element that constitutes that network are also arbitrary.

Also, in this second embodiment, the congestion level table 12 of the input side transfer unit 2 and the congestion status monitoring unit 61 of the output side transfer unit 6 are provided similarly as in the first embodiment. In addition, a portion that sets the congestion level into the congestion level table 12 in the priority level attaching unit 21 of the first embodiment is provided at the input side transfer unit 2.

FIG. 7 shows an exemplary configuration related to the scheduling in each input side transfer unit 2 of the multiple stage switch type packet switch of this second embodiment.

The configuration of FIG. 7 includes packet queues 22 provided in correspondence to groups (flows, for example) with respect to which the scheduling is to be carried out, a class level scheduling setting unit 24, a transfer packet selection unit 26, and a congestion level table 32.

In the example shown in FIG. 7, it is assumed that the congestion level and the class are to be used in the scheduling. For this reason, FIG. 7 shows the configuration in which a congestion level field and a class field are provided in the congestion level table 32.

In the following, this second embodiment will be described in further detail.

Packets that are waiting for the transfers inside the input side transfer unit 2 can be transferred efficiently by classifying them into groups where members of each group share the same congestion status, and providing corresponding packet queues 22. For example, the packet queue 22 is provided for each packet flow (or virtual connection). As another example, it is also effective to provide the packet queue 22 for each class of each output port of each output side transfer unit 6 of the packet switch. More simply, it is also possible to provide the packet queue 22 for each class of each output side transfer unit 6, Note however that the classification according to classes is unnecessary in the case of a packet switch that does not have a concept of classes.

Here it is assumed that the packet queue 22 is provided and managed for each flow.

When the congestion status is transferred from the output side transfer unit 6, the input side transfer unit 2 stores/updates the congestion level of each flow in the congestion level table 32 accordingly. When each flow has an attribute of class, it is also convenient to store this information in the same table 32.

The transfer packet selection unit 26 of FIG. 7 refers to the congestion level table 32 and the class level scheduling setting unit 24 at a time of selecting a packet to be transferred. The class level scheduling setting unit 24 sets a packet selection policy among classes, such as that the transfer rate of the real time class (RT of FIG. 7) is limited to be 80% of the maximum packet transmission rate from the input side transfer unit 2 at most and packets of the real time class are outputted at a higher priority over packets of the best effort class (BE of FIG. 7), for example.

In this second embodiment, the transfer packet selection unit 26 first carries out (i) a selection of a class according to the setting content stored in this class level scheduling setting unit 24, then (ii) a selection of a flow destined to the non-congested destination as much as possible, from flows of the selected class.

At this point, ideally speaking, the flow destined to the least congested destination should be selected, but it is not necessarily so easy to select the flows strictly in an order of their congestion levels depending on the convenience of the implementation. However, it is possible to achieve a sufficient effect by selecting the flow destined to the non-congested destination more often than the flow destined to the congested destination. As a simplest possible implementation, it is possible to roughly classify the flows into three groups according to their congestion levels, and select a flow from the least congested group. In this way, a flow is not necessarily selected strictly in an order of their congestion levels within the same group, but flows can be selected in roughly increasing order of the congestion levels overall.

When a flow is selected, the transfer packet selection unit 26 next carries out (iii) a transfer of packets to the switching unit 4 starting from a top of the packet queue 22 of that flow.

Thereafter, the above operations (i) to (iii) are repeatedly executed.

As described, according to this second embodiment, the input side transfer unit 2 transfers packets at a higher priority to the non-congested destinations, so that the problem of affecting the flow of packets destined to the non-congested destinations due to the influence of the flow that is already affected by the congestion can be easily resolved.

Also, in this second embodiment, when a packet is transferred, the latest congestion status of the flow is notified in response to the transfer of that packet, so that there is an advantage that the selection priority level of that flow is dynamically changed-to the appropriate value according to the latest congestion status.

Note that this second embodiment (the packet selection in the scheduling) can be practiced in combination with the first embodiment (the packet selection in the case of collision).

In such a case, it is also possible to expect the following effects. Namely, if there are only packets destined to the congested destinations inside the input side transfer unit 2, these packets would be outputted consecutively toward the congested destinations, but these packets have a high probability of being discarded and re-transmitted. However, when the second embodiment is combined with the first embodiment, the priority levels according to the congestion levels are attached to the packets so that the outputting of these packets does not cause any problem. Such a configuration has an advantage that it can be realized more simply than a control for suppressing the transfers of the packets destined to the congested destinations. In the control for suppressing the transfers, there is a need to carry out the strict control in order to prevent the lowering of the utilization efficiency of the switching unit 4 due to the excessive suppression, whereas this configuration only requires a much simpler control.

Also, when the second embodiment is combined with the first embodiment, the congestion level table (and a portion to obtain the congestion level from the notified congestion status) can be given in a configuration in which a portion for attaching the priority level to the packet and a portion to be used for the scheduling are independently provided, or in a configuration in which these portions are integrally provided in a single congestion level table.

Note also that, in the case of implementing the first and/or second embodiments described above, it is preferable to define a valid period for the congestion level. For example, at the input side transfer unit 2, if the new congestion status is not notified for a prescribed period of time after the congestion level of a given flow is determined, that old congestion level can be invalidated.

Figure 8:
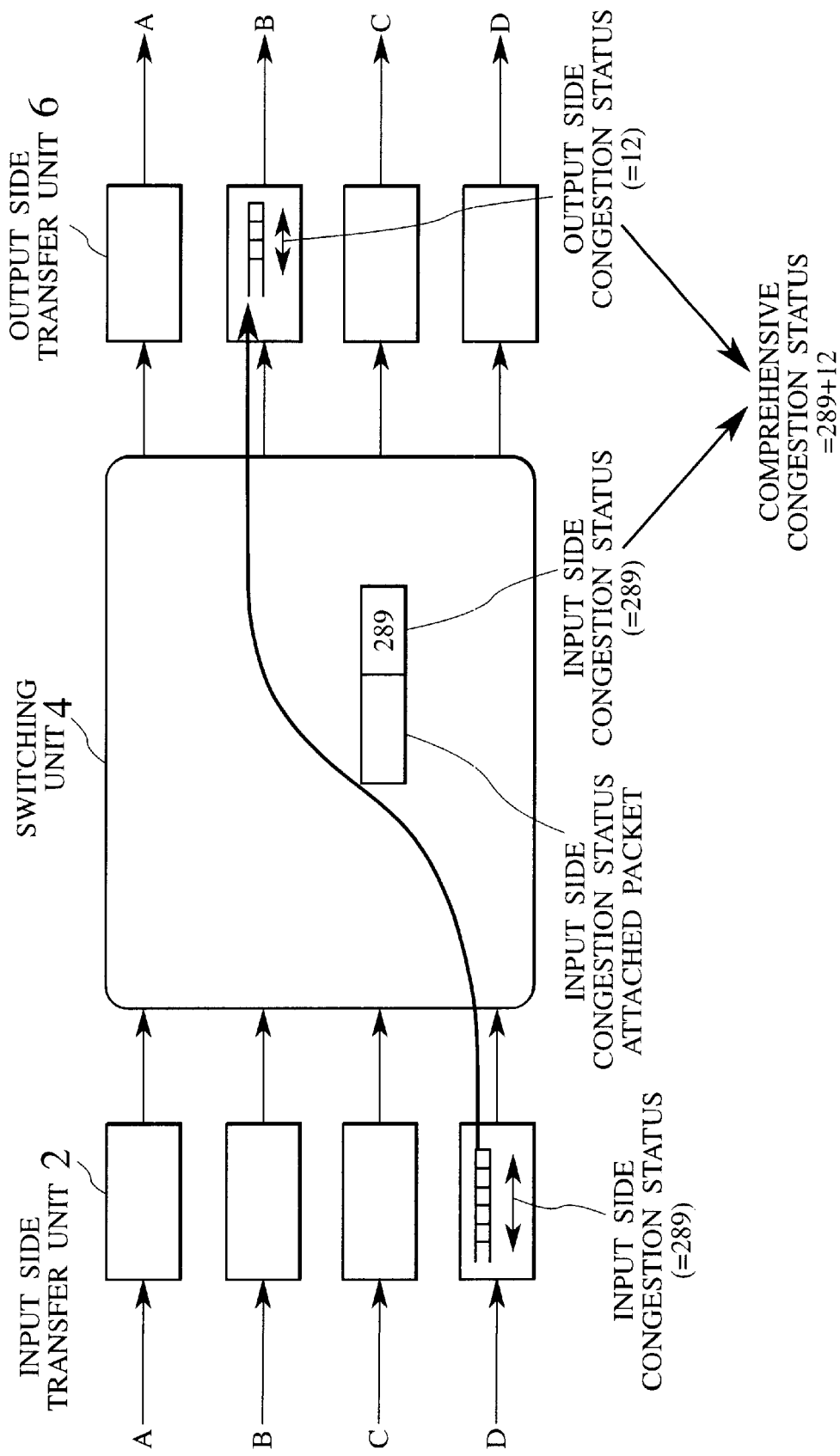
FIG. 8 is a schematic block diagram showing an exemplary configuration of a packet switch according to the third embodiment of the present invention.

Referring now to FIG. 8, the third embodiment of a packet switch and a packet switching method according to the present invention will be described in detail.

In the first and second embodiments, the features for preventing the flows of packets destined to the non-congested output ports or the like from being affected by the congestion of the other unrelated portion have been mainly described.

In this third embodiment, a mechanism for notifying a request to lower the packet transmission rate to a user who is transmitting packets that are causing the congestion will be described.

This third embodiment is applicable to any of the first embodiment, the second embodiment, and a combination of the first and second embodiments, but it is also possible to practice this third embodiment independently (that is, this third embodiment is applicable regardless of a configuration of the switching unit), and by practicing this third embodiment in combination with the first embodiment and/or the second embodiment, it is possible to construct a packet switch with an excellent comprehensive congestion handling mechanism.

FIG. 8 shows an exemplary configuration of a multiple stage switch type packet switch according to the third embodiment, along with the outline of the operation of this switch.

A function for notifying the congestion to the user has conventionally been proposed or practiced in the single stage switch type packet switch. However, it has been difficult to apply-this function effectively to the multiple stage switch type packet switch with a large number of ports. In the following, as a method for notifying the congestion to the user, three major methods used in the conventional single stage switch type packet switch will be described first.

The first method for notifying the congestion is a method in which the congestion is notified by the packet discarding. For example, in the protocol called TCP that is widely used in the Internet, when the packet discarding is detected, a control to make the transfer rate (a window size to be accurate) smaller is activated in order to relieve the congestion. In the discarding control for the packet switch that handles packets transferred by TCP, the method called RED (Random Early Detection) which increases the packet discarding probability as the congestion becomes worse is generally considered superior. In the case of notifying the congestion by the packet discarding, it is known that the congestion can be notified to the user quicker by discarding the top packet of the packet queue rather than discarding the tail packet of the packet queue, and in this way a possibility of relieving the congestion before it becomes severe can be made higher.

The second method for notifying the congestion is a method using the congestion experience notification, in which a congestion experience field is provided in a part of a packet header and this field is marked in a packet that has experienced the congestion so that the user can be notified of the congestion when this field is marked. In the case of ATM communications, this method is called EFCI (Explicit Forward Congestion Indication). Also, in the Internet, this method is called ECN (Explicit Congestion Notification) which is currently under the process of standardization. Similarly as in the case of the packet discarding based method, in the case of the congestion experience notification, it is known that the congestion can be notified to the user quicker by marking the top packet of the packet queue rather than marking the tail packet of the packet queue.

The third method for notifying the congestion is a method using BECN (Backward Explicit Congestion Notification). In the case of ATM communications, there is a proposition in which a switch generates a special cell (a packet is called a cell in ATM communications) called a BECN cell in order to notify the congestion when the congestion occurs and transfers this BECN cell toward a transmitting side user. A processing for loading information onto a resource management cell of an ABR service category in ATM is similar in a sense that it also transfers information directly toward a transmitting side user. In the Internet, there is also a similar control message called Source Quench. In the case of BECN, the congestion is directly notified to an upstream side user rather than a downstream side user, so that there is no need to carry out anything special with respect to a top packet of the packet queue. However, at a time of determining a user to which BECN is to be transmitted, it is preferable to make a judgement at a location where the congestion is monitored, i.e., at an output side of the packet switch, from a viewpoint of realizing the fair congestion notification. This is because the congestion notification should be made with respect to a user who is most responsible for causing the congestion at each congested location.

In the above, three major methods for the congestion notification have been described. What is common to all these methods is that it is better to carry out the congestion control at the output of the queue as much as possible. When this factor is taken into consideration in the packet switch of each embodiment described above, it can be said that it is preferable to carry out the congestion control at the output side transfer unit 6 rather than the input side transfer unit 2. In this regard, in the conventional multiple stage switch type packet switch, it has been impossible for the output side transfer unit 6 to accurately comprehend the congestion status inside the input side transfer unit 2, so that it has been difficult to comprehend the congestion status of the packet switch as a whole. If it is a packet switch with the lesser number of ports such as a single stage switch type packet switch, it has been possible to realize connections such that each output side transfer unit 6 can monitor the congestion statuses of all the input side transfer unit 2, but if it is a packet switch with the large number of ports such as a multiple stage switch type packet switch, it has been difficult to realize such connections.

As a method for resolving this problem, as shown in an example of FIG. 8, it is possible to consider a method in which the congestion status inside the input side transfer unit 2 is notified to the output side transfer unit 6 along with a packet, and the output side transfer unit 6 carries out the congestion control by judging the comprehensive congestion status from the congestion status inside the input side transfer unit 2, in the packet switch in which a packet is to be transferred from the input side transfer unit 2 via the switching unit 4 to the desired output side transfer unit 6.

In an example of FIG. 8, a packet queue length for each flow (which is assumed to be 289 for instance) is transferred as the input side congestion status of the input side transfer unit [D] along with a packet to the output side transfer unit [B]. When the congestion status inside the output side transfer unit [B] is to be monitored in terms of a packet queue length for that flow (which is assumed to be 12 for instance), the output side transfer unit [B] can comprehend the amount of queued packets for that flow that exist within the packet switch by calculating a total sum of the input side packet queue length and the output side packet queue length (289+12=301).

If the method of congestion notification to the user is RED, it suffices to determine a probability for discarding the top packet of the packet queue in addition to the amount of queued packets. If the method of congestion notification to the user is ECN, it suffices to determine whether a packet is to be marked or not by comparing the amount of queued packets with a threshold. If the method of congestion notification to the user is Source Quench, it suffices to determine whether a Source Quench message is to be transferred by comparing the amount of queued packets with a threshold.

This third embodiment is also effectively functional in the case of accounting for the congestion status for each class, the congestion status for each transfer unit, etc., in addition to the congestion status for each flow given by the queue length for each flow, and utilizing information that can be obtained as a result.

In the conventional packet switch with a large number of ports, it has been impossible to monitor the congestion statuses of all the input side transfer units at the output side, but according to this third embodiment, it is possible to ascertain the congestion statuses of the input side transfer units 2 at the output side transfer unit 6, and it is possible to ascertain the congestion status of a route through which a packet is to be transferred comprehensively in addition to the congestion status inside the output side transfer unit 6. This third embodiment also satisfies a requirement that the control for the purpose of notifying the congestion to the user should preferably be carried out at the output of the packet queue, and has an advantage that it is easily applicable to the multiple stage switch type packet switch with a large number of ports.

Figure 9:
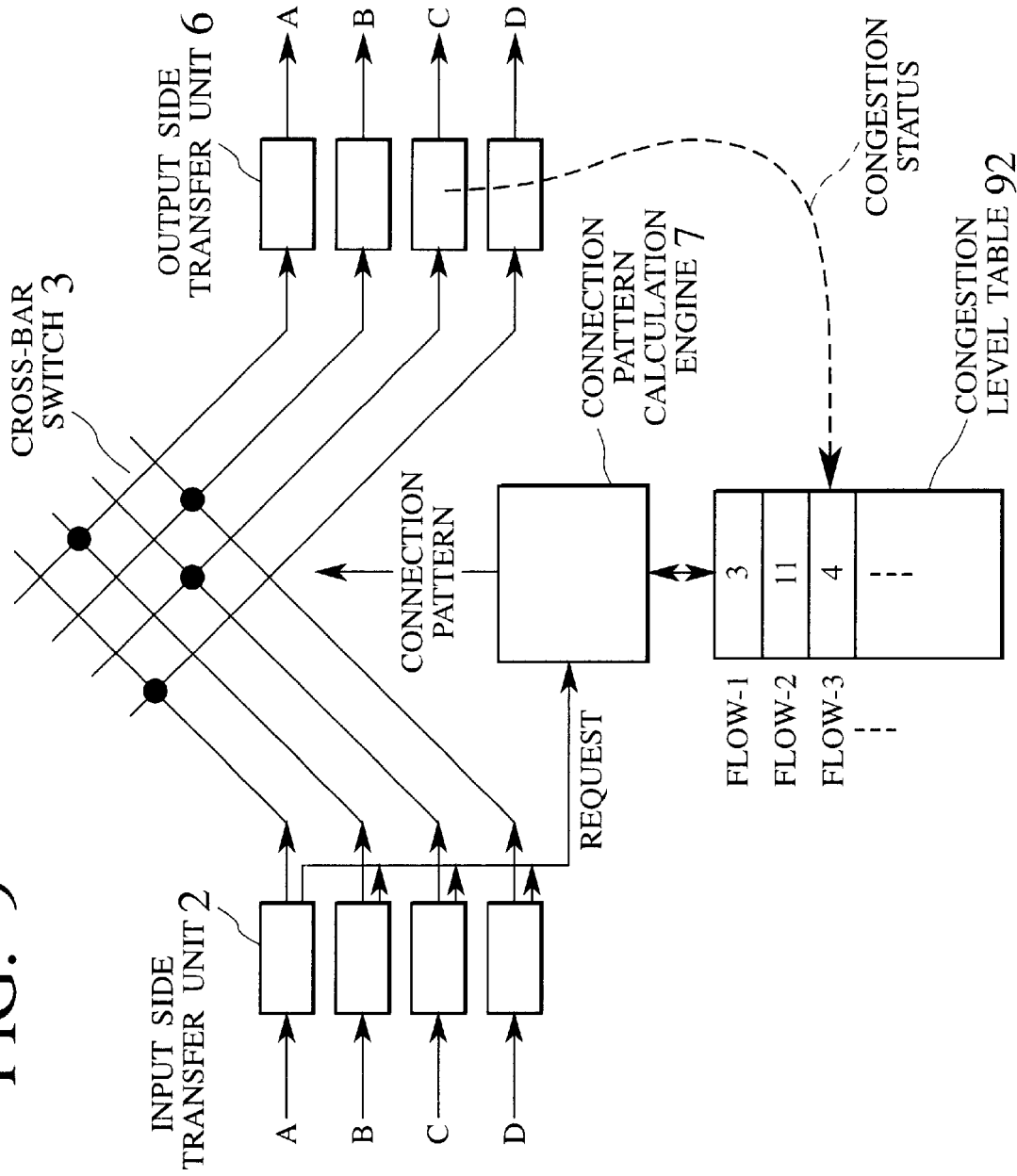
FIG. 9 is a schematic block diagram showing an exemplary configuration of a packet switch according to the fourth embodiment of the present invention.

Referring now to FIG. 9, the fourth embodiment of a packet switch and a packet switching method according to the present invention will be described in detail.

In the first to third embodiments described above, the case of applying the present invention to a packet switch in which a collision may occur within the switching unit at a time of transferring packets from the input side transfer unit to the output side transfer unit has been mainly described (in the first embodiment, a packet to be transferred at a higher priority is determined according to the priority level according to the congestion status of its destination when the collision occurred). However, the present invention is also applicable to a packet switch in which no internal collision occurs, such as a packet switch having a cross-bar type switching unit, for example. In other words, it is also possible to realize a cross-bar type packet switch utilizing a control mechanism corresponding to the first embodiment (or a combination of the first embodiment with the second embodiment and/or the third embodiment).

In general, in a packet switch, it is necessary to calculate a connection pattern for connecting the input side transfer unit and the output side transfer unit at high speed. For example, in a multiple stage switch as shown in FIG. 1, the connection pattern for connecting the input side transfer unit and the output side transfer unit is effectively calculated as autonomous distributed routing of packets is carried out and a route of a packet that survived the collision is obtained. On the other hand, in the cross-bar type switch, instead of adopting such an autonomous distributed approach, a centralized engine for calculating the connection pattern exists at one location in the switch. In general, the amount of calculations of this engine is the order of $N^2$ when the number of ports in the switch is N, and it is known that the calculation becomes more difficult as the number of ports is increased. This fourth embodiment is applicable to an algorithm of such a connection pattern calculation engine.

FIG. 9 shows an exemplary configuration of a cross-bar type packet switch according to the fourth embodiment, along with the outline of the operation of this packet switch. FIG. 9 shows an exemplary case corresponding to the first embodiment.

The basic overall configuration of the multiple stage switch type packet switch of this fourth embodiment is similar to that of FIG. 1 as in the first embodiment, in that a packet entered from an input port is transferred from an input side transfer unit 2 via a cross-bar switch 3 to a desired output side transfer unit 6, and outputted from there to an output port. Also, similarly as in the first embodiment, the number of input ports and the number of output ports in this packet switch are arbitrary, a plurality of input ports or output ports may be set in correspondence to one input side transfer unit or output side transfer unit, the internal network configuration inside the switching unit of this packet switch is also arbitrary, and the number of inputs and the number of outputs of each switching element that constitutes that network are also arbitrary. In this case, the switching element can be an LSI that integrates one or more cross points.

Note that the priority level attaching unit, the congestion status monitoring unit, the congestion level table, and the packet selection unit with respective functions similar to those of the first embodiment are also provided, but they are assumed to be incorporated into an algorithm of a connection pattern calculation engine 7. However, in the case of using a separate hardware as in the case of using a counter for the purpose of monitoring the congestion status at the congestion status monitoring unit, for example, the corresponding portion is to be implemented similarly as in the embodiments described above. Any portion other than a portion that is inevitably incorporated into the algorithm of the connection pattern calculation engine 7 such as the control and processing to be carried out within the switching unit may also be implemented in a manner similar to that of the embodiments described above.

Now, upon receiving a data transfer request of the input side transfer unit 2, the connection pattern calculation engine 7 calculates the connection pattern of the cross-bar switch 3. Here, as shown in FIG. 9, the information regarding the congestion status is sent from the output side transfer unit 6 to the connection pattern calculation engine 7.

This connection pattern calculation engine 7 holds (that is, carries out a simulation of) a tournament among data transfer requests from the input side transfer units 2 using its internal software, and notifies the connection pattern to the cross-bar switch 3 such that data corresponding to requests that survived the tournament will be exchanged. As a tournament table to be used here, a prescribed topology (such as a topology shown in FIG. 1, for example) can be used.

In the case of using the topology shown in FIG. 1, the tournament is held by using the topology of the routing network by rearranging requests into a random order by using the topology of the random network.

In the competition of the tournament, the surviving request is determined according to the priority level that is set or changed by accounting for the congestion level in a congestion level table 92.

When a set of requests for which the transfer towards the output side transfer units 6 are to be permitted is obtained in this manner, the connection pattern is calculated and data are exchanged by the cross-bar switch 3 that is set up by the calculated connection pattern.

In the case of using the topology shown in FIG. 1, when the number of ports in the switch is N, there are N degrees of freedom along a vertical direction and logN degrees of freedom along a horizontal direction so that requests for which the transfer towards the output side transfer units 6 are to be permitted can be obtained by the calculations of the order of N·logN. Thus the calculation can be carried out relatively fast, and there is also an advantage that the fairness can be secured because the congestion statuses of the output side transfer units 6 are accounted for.

Note that the configuration in which this fourth embodiment is applied to a combination of the first embodiment and the second embodiment and/or the third embodiment can also be realized similarly.

As described above, according to the present invention, the priority level according to the congestion status of the transfer target is attached to a packet, and the processing at a time of packet collision is carried out by accounting for this priority level, so that it becomes possible to carry out the packet transfer control according to the congestion status of the transfer target of each packet. For example, by attaching a relatively high priority level to packets destined to non-congested ports, it is possible to prevent the flows of packets destined to the non-congested ports from being affected by the influence of packets destined to a congested port.

Also, according to the present invention, by attaching a higher priority level to a once discarded packet, it is possible to make the once discarded packet less likely to be discarded again at a time of re-transmission.

Also, according to the present invention, by attaching a lower priority level to a packet corresponding to a top portion of data than packets corresponding to subsequent portions of data, it is possible to transfer a plurality of packets subdividing the data collectively once the packet corresponding to the top portion of data reaches to the transfer target.

It is to be noted that, in each embodiment described above, the case of applying the present invention to a multiple stage switch type packet switch has been mainly described, but the present invention is also applicable to a single stage switch type packet switch. Also, the present invention is utilizable as a method for handling the congestion of the packet network as a whole.

It is also to be noted that it is possible to realize a part or a whole of a packet switch of the present invention by a processor (CPU) operated by software. For example, each input side transfer unit, each output side transfer unit, or both may be realized by one or a plurality of CPUs.

By realizing each input side transfer unit or each output side transfer unit of the packet switch by CPU, it becomes possible to set up and control the management of the information regarding packets such as the transfer scheduling algorithm, the packet buffer allocation algorithm, the packet header format, the congestion status, etc., using software. In particular, it is possible to realize the control regarding the setting of the priority level according to the congestion status (the monitoring of the congestion status at the output side, the transfer of the congestion status to the input side, the management of the congestion information at the input side, the setting of the priority level of the packet, etc.) that is the one of the major features of the present invention, by software.

Using CPU, it becomes possible to change the control scheme so that the system can be made flexible. On the other hand, using hardware instead of CPU, it becomes possible to realize the necessary control at relatively low cost. A judgement as to whether to use hardware or software should be made by in view of such a trade off relationship, but the present invention is effectively functional regardless of whether a part or a whole of the present invention is realized using hardware or software.

It is also possible to realize the input side transfer unit and the corresponding output side transfer unit having the same port as that input side transfer unit by an identical LSI, and implement the present invention by one or a plurality of CPUs incorporated into that LSI. It is also possible to realize the input/output side transfer units corresponding to a plurality or ports by a single CPU.

As should be apparent from the above, the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. In particular, the packet switch of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet switch, comprising:
   a plurality of input side transfer units from which packets are entered;
   a plurality of output side transfer units from which packets are outputted;
   a switching unit through which each packet entered from each input side transfer unit is switched to a desired output side transfer unit;
   a congestion status monitoring unit configured to monitor a congestion status of each transfer target to which each packet can be destined to reach within the packet switch;

a priority level attaching unit configured to attach a priority level to each packet, according to the congestion status of a transfer target of each packet monitored by the congestion status monitoring unit; and a packet selection unit configured to select one packet that is to be transferred at a higher priority among colliding packets when a packet collision occurs within the switching unit, according to the priority level attached to each colliding packet.

2. The packet switch of claim 1, wherein the priority level attaching unit attaches a lower priority level to a packet for which a congestion level of a transfer target is higher.

3. The packet switch of claim 1, wherein the priority level attaching unit is provided inside each input side transfer unit.

4. The packet switch of claim 1, wherein the priority level attaching unit sets a temporarily high priority level to one or a plurality of packets that are to be transferred to one transfer target initially when the congestion status of said one transfer target that is referred in order to attach the priority level to each packet is unknown or invalid.

5. The packet switch of claim 1, wherein the priority level attaching unit sets the priority level to be attached to each packet by referring to a congestion level table that stores a congestion level set to each prescribed transfer target according to the congestion status monitored by the congestion status monitoring unit, the congestion level table being provided for each one or a plurality of the input side transfer units.

6. The packet switch of claim 1, wherein the congestion status monitoring unit is provided inside each output side transfer unit.

7. The packet switch of claim 6, wherein the congestion status monitoring unit monitors the congestion status of each prescribed transfer target for a corresponding output side transfer unit, each class of the corresponding output side transfer unit, each port of the corresponding output side transfer unit, each classes of each port of the corresponding output side transfer unit, or each flow of each class of each port of the corresponding output side transfer unit.

8. The packet switch of claim 1, wherein the congestion status monitoring unit notifies a monitored congestion status such that the monitored congestion status is reflected into the priority level attached by the priority level attaching unit.

9. The packet switch of claim 8, wherein the priority level attaching unit is provided inside each input side transfer unit, and the congestion status monitoring unit notifies a prescribed information regarding the monitored congestion status to one input side transfer unit that has transmitted one packet, at a timing of arrival of said one packet to the output side transfer unit.

10. The packet switch of claim 1, further comprising:
a scheduling unit provided for each input side transfer unit and configured to control an order of transfers of a plurality of packets that are waiting for transfers to the switching unit at each input side transfer unit, such that those packets destined to non-congested transfer targets are transferred to the switching unit at higher priority by accounting for the congestion status of a transfer target of each packet.

11. The packet switch of claim 1, wherein a packet with the priority level attached thereto is transferred from a input side transfer unit via the switching unit to a output side transfer unit, the switching unit transfers one colliding packet selected from colliding packets by accounting for the priority level attached to each colliding packet, to the output side transfer unit when a packet collision occurs inside the switching unit while discarding other colliding packets inside the switching unit, the input side transfer unit re-transmits each discarded packet when a packet discarding due to the packet collision is detected, and the priority level attaching unit is provided at the input side transfer unit and sets the priority level to be attached to each re-transmission packet higher than the priority level originally attached to a corresponding discarded packet.

12. The packet switch of claim 1, wherein a packet with the priority level attached thereto is transferred from a input side transfer unit via the switching unit to an output side transfer unit, the switching unit transfers one colliding packet selected from colliding packets by accounting for the priority level attached to each colliding packet, at higher priority to the output side transfer unit when a packet collision occurs inside the switching unit, the priority level attaching unit is provided at the input side transfer unit, and p1 when a plurality of packets subdividing one data are to be transferred from the input side transfer unit, the priority level attaching unit sets the priority level of one packet corresponding to a top portion of said one data lower than the priority level of other packets corresponding to subsequent portions of said one data.

13. The packet switch of claim 12, wherein the priority level attaching unit sets the priority level of said one packet than the priority level of the other packets by setting the priority level of the other packets higher than the priority level attached to packets that do not belong to said plurality of packets subdividing one data.

14. The packet switch of claim 1, wherein each input side transfer unit transfers a packet along with the congestion status inside the input side transfer unit at a time of transferring the packet via the switching unit to an output side transfer unit, and the output side transfer unit obtains a comprehensive congestion status using the congestion status inside the input side transfer unit that is notified along with the packet and the congestion status inside the output side transfer unit, and carries out a congestion control using the comprehensive congestion status in order to control an amount or a rate of packet flows flowing through a network in which the packet switch is provided.

15. A packet switch, comprising:
a plurality of input side transfer units from which packets are entered;

a plurality of output side transfer units from which packets are outputted;

a switching unit through which each packet entered from each input side transfer unit is switched to a desired output side transfer unit, the switching unit having a configuration in which no packet collision occurs;

a congestion status monitoring unit configured to monitor a congestion status of each transfer target to which each packet can be destined to reach within the packet switch; and a connection pattern calculation engine configured to attach a priority level to each packet, according to the congestion status of a transfer target of each packet monitored by the congestion status monitoring unit, carry out a simulation in which each packet is assumed to be transferred through a virtual switching network having a topology in which a packet collision may occur and a packet to be transferred at higher priority among colliding packets is selected according to the priority level attached to each colliding packet when the packet collision occurs in the virtual switching network, and determine a connection pattern of the switching unit such that a result of switching packets at the switching unit coincides with a result of transferring packets from the input side transfer units to the output side transfer units according to the simulation.

16. The packet switch of claim 15, wherein the switching unit is formed by a cross-bar switch, and the virtual switching network is a switching network formed by switching elements.

17. A packet switching method of a packet switch in which a packet is transferred from an input side transfer unit via a switching unit to a desired output side transfer unit, the method comprising:

transferring the packet by attaching a priority level according to a congestion status of a transfer target of the packet to which the packet is destined to reach within the packet switch, from the input side transfer unit to the switching unit;

switching the packet transferred from the input side transfer unit according to the transfer target of the packet at the switching unit, and transferring one colliding packet selected from colliding packets by accounting for the priority level attached to each colliding packet, at higher priority to the output side transfer unit when a packet collision occurs within the switching unit; and notifying information indicating a monitoring result of the congestion status for a prescribed unit of monitoring, from the output side transfer unit to which the packet has reached, to the input side transfer unit which transmitted the packet.

18. A computer program product for causing one or a plurality of a computers to function as a packet switch in which a packet is transferred from an input side transfer unit via a switching unit to a desired output side transfer unit, the switching unit having a function of selecting one packet that is to be transferred at a higher priority among colliding packets when a packet collision occurs within the switching unit, according to a priority level attached to each colliding packet, the computer program product comprising:

a first computer readable program code for causing said one or a plurality of computers to monitor a congestion status of each transfer target to which each packet can be destined to reach within the packet switch; and a second computer readable program code for causing said one or a plurality of computers to attach the priority level to each packet, according to the congestion status of a transfer target of each packet monitored by the first computer readable program code.

* * * * *